(12) United States Patent
Schmidt

(10) Patent No.: US 8,333,110 B2
(45) Date of Patent: Dec. 18, 2012

(54) DEVICE FOR ANALYZING THE STEP-BY-STEP INJECTION RATE PROVIDED BY A FUEL INJECTION SYSTEM USED IN A HIGH POWER HEAT ENGINE

(75) Inventor: Francois Schmidt, Millery (FR)

(73) Assignee: EFS SA (FR)

( * ) Notice: Subject to any disclaimer, the term of this patent is extended or adjusted under 35 U.S.C. 154(b) by 63 days.

(21) Appl. No.: 13/062,013

(22) PCT Filed: Jul. 21, 2009

(86) PCT No.: PCT/FR2009/051455
§ 371 (c)(1),
(2), (4) Date: Apr. 20, 2011

(87) PCT Pub. No.: WO2010/026322
PCT Pub. Date: Mar. 11, 2010

(65) Prior Publication Data
US 2011/0185800 A1    Aug. 4, 2011

(30) Foreign Application Priority Data
Sep. 5, 2008  (FR) ...................................... 08 04885

(51) Int. Cl.
*G01M 15/00* (2006.01)
(52) U.S. Cl. .................................. 73/114.51; 73/114.48
(58) Field of Classification Search ............... 73/114.45, 73/114.48, 114.51
See application file for complete search history.

(56) References Cited

U.S. PATENT DOCUMENTS

| | | | |
|---|---|---|---|
| 4,141,243 A * | 2/1979 | Van Tassel et al. | 73/114.48 |
| 4,561,397 A * | 12/1985 | Tsukamoto et al. | 123/357 |
| 4,798,084 A * | 1/1989 | Takahashi et al. | 73/114.48 |
| 6,755,076 B1 * | 6/2004 | Schmidt et al. | 73/114.47 |
| 7,930,930 B2 * | 4/2011 | Ungaro et al. | 73/114.48 |
| 2011/0185799 A1 * | 8/2011 | Schmidt | 73/114.48 |

FOREIGN PATENT DOCUMENTS

| | | |
|---|---|---|
| EP | 0861979 A2 | 9/1998 |
| FR | 2795139 A1 | 12/2000 |
| JP | 200569128 A | 3/2005 |

OTHER PUBLICATIONS

International Search Report PCT/FR2009/051455; Dated Nov. 19, 2009.

* cited by examiner

*Primary Examiner* — Freddie Kirkland, III
(74) *Attorney, Agent, or Firm* — Cantor Colburn LLP

(57) ABSTRACT

The invention relates to a device that includes: a first chamber (3) for measuring a constant volume, and in which the fuel is injected; pressure (5a, 5b) and temperature (6) sensors associated with said first chamber (3); and a second measuring chamber (8) located downstream from the first, into which the fuel drained from the first chamber is sent. The volume of the second chamber (8) varies according to the movement of a piston (11), the movement of which is measured by means of a sensor (13). One or more additional measuring chambers (8a, 8b, ... 8n) of variable volumes are connected in parallel with the second chamber (8) and also receive the fuel drained from the first chamber (3), the volumes received in said different chambers being added up to obtain the total volume supplied for a single injection step. The device can be used for high injection rates.

6 Claims, 1 Drawing Sheet

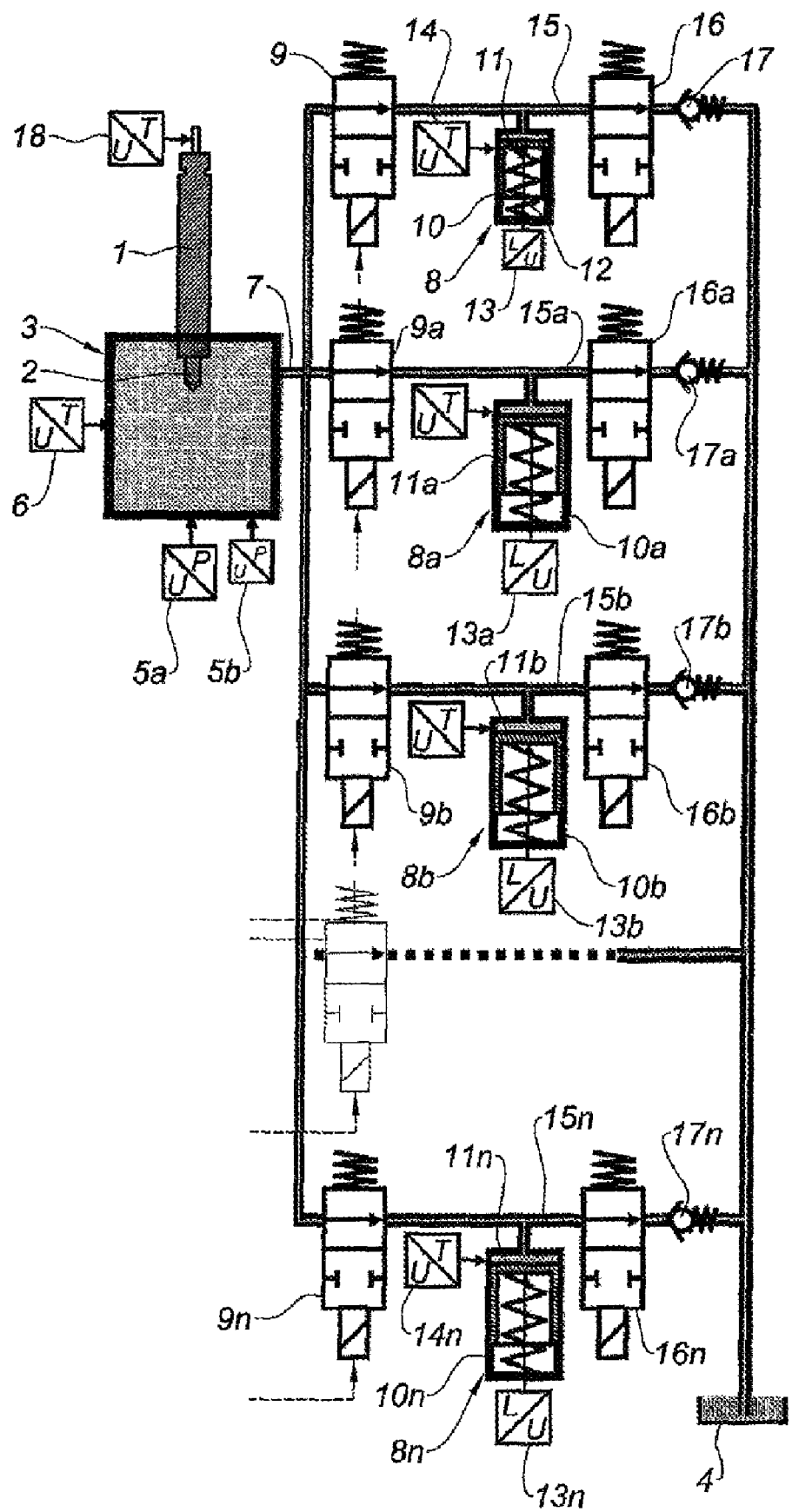

DEVICE FOR ANALYZING THE STEP-BY-STEP INJECTION RATE PROVIDED BY A FUEL INJECTION SYSTEM USED IN A HIGH POWER HEAT ENGINE

TECHNICAL FIELD

The present invention relates to a device making it possible to analyze the step-by-step injection rate provided by a fuel injection system used in a heat engine. The concerned injection systems are in particular those equipping diesel engines. The invention described here is more particularly applicable to injection systems used in high power engines, therefore injection systems with a high fuel flow.

BACKGROUND

Measuring devices are already known for allowing the builders of injection systems and heat engines to develop injectors as well as perform adjustments and compliance verifications during production and during the installation of these systems for their final use. These measuring devices are used in conjunction with a specific test block, the role of which is primarily to drive the rotation of an injection pump and support the different elements of the injection system during tests. The measurements done with these types of devices must make it possible to precisely know both the values of injected fuel volumes and the injection times or angles.

To that end, already known from French patent FR 2795139 A or its equivalent, European patent EP 1187987 B1, in the Applicant's name, is a device making it possible to instantaneously analyze the step-by-step injection rate provided by an injection system used in a heat engine, this device being characterized essentially by the combination of two measuring chambers.

Thus, the device mentioned here includes a first chamber for measuring a constant volume chamber in which the fuel is injected, with which chamber a pressure sensor and a temperature sensor are associated that respectively measure the pressure and the temperature reigning in that chamber, as well as means making it possible to at least partially empty said first measuring chamber.

This device also includes, downstream of the first measuring chamber, a second measuring chamber in which the fuel drained from the first measuring chamber is sent, the volume of the second measuring chamber varying depending on the movement of a piston whereof the movement is measured using a movement sensor.

An electronic section controls the device assembly, said section also analyzing the information received from the different sensors.

The operating principle of this device is as follows:

When the device is ready to perform a measurement, i.e. when fuel is present in the two measuring chambers and a predetermined set pressure reigns in the first measuring chamber, an injection is done. This causes an increase of the pressure in the first measuring chamber, related to the amount of injected fuel, the characteristics of the fuel, the environmental conditions, and in particular the temperature and the initial pressure, and the volume of the chamber. At the end of the injection, the fuel contained in the first measuring chamber is partially emptied into the second measuring chamber, the pressure in the first measuring chamber thus being brought back to its initial set value and this first chamber being ready then to receive a new injection. The fuel that arrives in the second measuring chamber causes the volume to increase in this second measuring chamber, by pushing the piston. The movement of the piston is measured and, knowing the diameter of the piston, a part of the electronic section calculates the exact volume of the fuel. This second measurement allows the electronic section to calibrate, at any moment and very accurately, the measurements that are done by the first measuring chamber.

In one advantageous embodiment of the device, described in the aforementioned patent documents, a rapid electrovalve controlled by a portion of the electronic section, and a discharging device, are positioned between the two measuring chambers to partially drain the first measuring chamber after an injection until this first measuring chamber returns to the pressure that reigned therein before the considered injection. In this case, the electronic section also advantageously includes a compensation function, making it possible to take a potential pressure difference into account in the first measuring chamber after two successive emptyings.

The term "fuel," used here to qualify the fluid used in the device, in particular the fluid filling the two measuring chambers and also the injected fluid, designates an actual fuel or, preferably, a fluid that has hydraulic characteristics close to those of a fuel but with a flash point temperature much higher than that of a fuel in order to minimize the risks of fire and explosion.

Overall, the first measuring chamber, with a constant volume, makes it possible to precisely provide the "form" of the injection, while the second measuring chamber, with a variable volume, makes it possible to measure the amount of fuel injected. The processing done in the electronic section makes it possible to offset the flaws of each of the measurements by the qualities of the other.

The existing device, recalled above, is more particularly adapted to injectors that deliver a low or average amount of fuel, typically up to 100 liters per hour.

To develop high power injectors and engines, like those used to propel ships or to drive large electric generators, it is necessary to be able to perform instantaneous injection rate measurements, step by step, for more significant rates.

The production to that end of a larger measuring device, simply homothetic of the known device recalled above, faces difficulties in making the second measuring chamber, i.e. the variable-volume chamber used to perform a volume measurement via the movement of a piston.

For the first measuring chamber, which has a constant volume and is used to perform an instantaneous measurement of the pressure increase during the injection into this volume already filled with fluid, there is no technical difficulty in simply increasing the dimensions to adapt it to a higher rate. Instead of a volume typically smaller than a liter, unique to earlier embodiments, it is easy to provide a volume with a higher value, adapted to the injection pump and/or the injector that is found in the test. The value of this volume is to be determined, so as to obtain a typical increase of the pressure of several bars or tens of bars, in the first measuring chamber, during a single injection, which leads to a typical volume of several liters or tens of liters for this chamber, without these values being limiting. Thus, there would not be any drawback in principle of using still much larger volumes, if necessary, to measure very large instantaneous rates. The production of such a volume in fact remains simple, and does not pose any particular technical problems. It may potentially involve making a relatively thick, and therefore heavy, piece, due to the fact that it must resist an internal pressure that may typically go up to as much as 200 bars, but these conditions or requirements are not unusual for instrumentation of the type concerned here. Moreover, since it involves making a constant-volume chamber, without mobile parts or other delicate elements, this part will not be expensive and it will be particularly robust, regardless of its interior volume.

However, regarding the second, variable-volume measuring chamber with interior piston, difficulties arise, because this chamber must meet very strict technical imperatives, the main imperatives being:

The piston must slide perfectly, without locking or leaks, in the cylinder that delimits the measuring chamber, while the overall temperature of this chamber is generally kept relatively low, typically between 40 and 70° C., but the instantaneous temperature at the nose of the injector is high and can exceed 200° C. for modern injection systems with very high pressure, typically greater than 2000 bars.

The piston must be as light as possible in order to react quickly to the volume variations resulting from the emptying of fuel in the measuring chamber, which leads to making the piston with a hollow configuration and a very small wall thickness.

The assembly formed by the cylinder that delimits the measuring chamber, and by the piston slidingly mounted in that cylinder, must, however, be very robust to bear a large number of fuel injection cycles, therefore filling/emptying of said measuring chamber with movement of the piston, without damage.

Pistons are usually made whereof the diameter is between 10 and 35 millimeters, and that describe a travel between 1 and 10 millimeters, which corresponds to a unitary measuring volume between about 80 and 10,000 mm$^3$. It is common experience for the production difficulties to increase, both when one tries to make pistons with a diameter smaller than 10 mm and when one wishes to manufacture pistons with a diameter greater than 35 mm. In particular, a diameter increase of the piston, in order to adapt the device and in particular its second measuring chamber to high rates or volumes, would therefore not be a satisfactory solution.

The present invention aims to avoid these difficulties, and it therefore aims to provide a solution of the type considered here but adapted to large injection rates, typically greater than 100 liters per minute, while remaining economical.

To that end, the invention relates to a device making it possible to analyze the step-by-step injection rate provided by the fuel injection system used in a heat engine, the device comprising, in a known manner:

a first chamber for measuring a constant volume, in which the fuel is injected, a pressure sensor and a temperature sensor being associated with said first measuring chamber for measuring the pressure and the temperature, respectively, reigning in said first measuring chamber, means for at least partially emptying the first measuring chamber, downstream of the first measuring chamber, a second measuring chamber in which the fuel drained from the first measuring chamber is sent, the volume of the second measuring chamber varying depending on the movement of a piston whereof the movement is measured using a movement sensor, an electronic section controlling the device and analyzing the information received from the sensors, such that the partial draining of the first measuring chamber after injection is done until the pressure reigning in said first measuring chamber is reestablished therein before the injection, the device being, according to the invention, essentially characterized by the fact that at least one additional measuring chamber, the volume of which varies according to the movement of a piston whereof the movement is measured using a movement sensor, is mounted downstream of the first measuring chamber, in parallel with the second measuring chamber, such that the fuel drained from the first measuring chamber is received in the second measuring chamber and/or in the or each additional measuring chamber, the electronic section being provided to measure and add the volumes received, for each injection, by the second measuring chamber and by the additional measuring chamber(s), so as to obtain a total volume corresponding to the amount of fuel delivered for an injection step.

BRIEF SUMMARY

Thus, the inventive idea comprises providing two or several variable-volume measuring chambers, mounted in parallel, instead and in place of a single second variable-volume measuring chamber. The total volume of fuel, drained from the first measuring chamber, can therefore be distributed into two or several other measuring chambers, each of which receives and measures, by the movement of its piston, a partial volume; the addition of all of the measured partial volumes provides the total volume injected at each step.

As a result, even for a high injection rate, and by multiplying the variable-volume measuring chambers mounted in parallel, it becomes possible to keep, for all of these chambers, limited dimensions, and in particular pistons whereof the diameter does not exceed the desired maximum value.

According to one embodiment of the device according to the invention, the electronic section is provided to synchronously control the draining of the first measuring chamber in the second measuring chamber and in the additional measuring chamber(s), in other words in all of the variable-volume measuring chambers. The transfers of fuel towards all of these measuring chambers are therefore simultaneous, as well as the measurements of the partial volumes whereof the sum corresponds to the total volume for an injection step. This embodiment has the advantage of its simplicity, from the perspective of controlling the device.

According to another embodiment of the device according to the invention, the electronic section is provided to separately, and in particular sequentially control the draining of the first measuring chamber in the second measuring chamber and in the additional measuring chamber(s), in other words in the different variable-volume measuring chambers. This other control mode slightly complicates the controlling of the device, each variable-volume chamber having to be controlled separately; however, it has the advantage of regularizing the flow leaving the first measuring chamber, some of the variable-volume measuring chambers receiving fluid while others are already in the draining process.

In the simplest design of the device, the second measuring chamber and the additional measuring chamber(s) are all identical and, in particular, have the same maximum capacity and the same section that also corresponds to the section of the piston.

However, it is advantageous that, among the second measuring chamber and the additional measuring chamber(s), there is at least one measuring chamber with a larger capacity than the others and at least one least one measuring chamber with a smaller capacity than the others, therefore at least two measuring chambers with different capacities and in particular different sections, the electronic section being provided to control one and/or the other of these measuring chambers as a function of the unitary quantities of fuel injected at each step. As will be understood, the measuring chamber with the larger capacity and in particular the larger section has a fairly limited absolute measuring precision, while the measuring chamber with the smaller capacity and in particular the smaller section has a high absolute measuring precision. Thus, the device has a large absolute measuring precision when the injected quantity is small, while keeping the possibility of measuring large injected quantities. The device therefore tends to procure a measurement whereof the relative precision remains substantially constant, which is a desired advantage for any measuring apparatus or device with a high measuring dynamic, i.e. making it possible to precisely measure both small quantities and large quantities. In the case at hand, it is possible to measure very correctly, i.e. with an absolute precision in the vicinity of one thousandth of the maximum scale, injected quantities between 100 mm$^3$ and 100,000 mm$^3$ per injection step.

It will be noted that, owing to its usage principle combined with several variable-volume measuring chambers, the device of the invention makes it possible not only to measure higher injection rates than a variable-volume single-chamber device, but it also makes it possible to measure injection rates for higher injection frequencies, in proportion to the number of implanted measuring chambers.

In other words, the configuration according to the invention is very advantageous due to the fact that, by a simple adaptation of the parameters of the controlling software, it becomes possible to measure higher rates at higher injection frequencies, without constructive modification of the device. This makes the device, subject matter of the invention, particularly well suited to characterize real injection systems which, in fact, inject larger unitary quantities, step by step, at a low rotational regime of the engine and lower unitary quantities, but more frequent ones, as the rotational regime of the engine increases.

BRIEF DESCRIPTION OF THE DRAWING

The invention will be better understood using the following description, in reference to the appended diagrammatic drawing, showing, as an example, an embodiment of this device for analyzing the step-by-step injection rate provided by a fuel injection system.

The sole FIGURE of the drawing shows, very diagrammatically, the mechanical portion of a device for measuring the quantity of injected fuel, according to the present invention.

DETAILED DESCRIPTION

This sole FIGURE shows an injector 1, the injection nozzle 2 of which is in a first measuring chamber 3, which is a constant-volume chamber. The first measuring chamber 3 is, in use, filled with a fluid that has hydraulic characteristics close to those of a fuel, but has a much higher flash point temperature than that of a fuel, in order to minimize the risks of fire and explosion. This fluid is also the fluid used in the injector 1. A reservoir 4 of this fluid is provided in the device.

In the illustrated example, the first measuring chamber 3 advantageously includes, as pressure sensor, a dynamic pressure converter 5a and a static pressure converter 5b. The dynamic pressure converter 5a, which can be made in the form of a piezoelectric converter, is responsible for measuring the dynamic component for which one seeks a high resolution—typically 0.001 bar—and a quick response. The static pressure converter 5b, which can be made in the form of a piezoresistive converter, is responsible for measuring the static component for which one essentially seeks a large dynamic, typically from 1 to 250 bars.

The first measuring chamber 3 is also equipped with a quick response temperature sensor 6.

The first measuring chamber 3 includes an outlet 7 that is oriented towards a second measuring chamber 8, thus situated (in reference to the direction of circulation of the fluid) downstream of the first measuring chamber 3. An electrovalve 9 is positioned between the first measuring chamber 3 and the second measuring chamber 8.

The second measuring chamber 8 is a variable volume chamber. It is made as a cylinder 10 in which a piston 11 is slidingly mounted, subjected to the thrust of a spring 12. The movement of the piston 11 is detected by a movement sensor 13, for example made in the form of an inductive sensor. A temperature converter 14 is also associated with the second measuring chamber 8.

Leaving from this second measuring chamber 8 is a drain channel 15, the opening and closing of which are controlled by a drain electrovalve 16, downstream of which a check valve 17 is placed. The drain channel 15 brings the fluid back to the reservoir 4 already mentioned.

According to the invention, the additional measuring chambers 8a, 8b, . . . 8n are mounted downstream of the first measuring chamber 3, in fluid circuit branches parallel to the circuit branch that includes the second measuring chamber 8. Each additional measuring chamber 8a, 8b, . . . 8n is also a variable volume chamber, made as a cylinder 10a, 10b, . . . 10n in which a piston 11a, 11b, . . . 11n is slidingly mounted whereof the movement is detected by a movement sensor 13a, 13b, . . . 13n.

On each of these branches of the circuit, between the output 7 of the first measuring chamber 3 and the corresponding additional measuring chamber 8a, 8b, . . . 8n, an electrovalve 9a, 9b, . . . 9n is positioned. The respective emptying channels 15a, 15b, . . . 15n of all of the circuit branches each include a drain electrovalve 16a, 16b, . . . 16n, and these drain channels 15a, 15b, . . . 15n meet up with each other and the drain channel 15 to bring the fluid back to the reservoir 4.

The device also includes, in a manner not shown, an electronic section that controls the assembly of the device and analyzes the information received from the different sensors. In particular, the electronic section:

controls the electrovalves 9, 9a, 9b, . . . 9b to direct the fluid coming from the outlet 7 of the first measuring chamber 3, towards one or the other of the other measuring chambers 8, 8a, 8b, . . . 8n;

controls the drain electrovalves 16, 16a, 16b, . . . 16n associated with these other measuring chambers 8, 8a, 8b, . . . 8n in order to drain them and return the fluid to the reservoir 4;

receives and processes the pressure and temperature measuring signals delivered by the sensors or converters 5a, 5b and 6 associated with the first measuring chamber 3;

receives and processes the movement signals of the pistons 11, 11a, 11b, . . . 11n of the other measuring chambers 8, 8a, 8b, . . . 8n delivered by the corresponding movement sensors 13, 13a, 13b, . . . 13n.

During the use of the device, to fill the first measuring chamber 3, fluid is pumped into the reservoir 4 using a pump (not shown). The fluid that fills this first measuring chamber 3 has, initially, a pressure equal to a predetermined set value. The measurement strictly speaking can then begin, according to the process described below:

The injector 1 performs, by the nozzle 2, an injection of fluid into the first measuring chamber 3. Owing to the converters 5a and 5b, the pressure, and in particular the increase of the pressure in the first measuring chamber 3, is then measured, which makes it possible to determine the curve of the injected fluid rate as a function of time, possibly performing a correction as a function of the temperature detected by the sensor 6. When the pressure in this first measuring chamber 3 no longer increases, it is deduced that the injection is finished.

The electrovalves 9, 9a, 9b, ... 9n are then opened, either synchronously, or separately and in particular sequentially, to transfer the fluid from the first measuring chamber 3 towards the other measuring chambers 8, 8a, 8b, ... 8n. The volume of these measuring chambers 8, 8a, 8b, ... 8n therefore increases, which is accompanied by a movement of the corresponding pistons 11, 11a, 11b, ... 11n. The movement sensors 13, 13a, 13b, ... 13n measure the respective movements of the pistons 11, 11a, 11b, ... 11n.

Each movement of a piston 11, 11a, 11b, ... 11n has a corresponding volume variation of the corresponding measuring chamber 8, 8a, 8b, ... 8n. The electronic section determines this volume variation, correcting it as a function of the signal provided by the temperature sensors, such as the converter 14. Moreover, the electronic section adds the partial fluid volumes determined for the different measuring chambers 8, 8a, 8b, ... 8n, so as to obtain a total volume, which corresponds to the quantity of fluid that has been injected into the first measuring chamber 3.

The electronic section also controls the different drain electrovalves 16, 16a, 16b, ... 16n to bring the fluid back into the reservoir 4 and to allow the pistons 11, 11a, 11b, ... 11n to return to their initial position, while the pressure in the first measuring chamber 3 returns to its initial set value. A new injection can then take place in this first measuring chamber 3, and so on.

As a function of the injection rate, and by adapted control of the electrovalves 9, 9a, 9b, ... 9n, the device can operate either by using all of the variable volume measuring chambers 8, 8a, 8b, ... 8n, or only some of these measuring chambers.

It should be noted that the temperature can be measured and taken into account at other various places, in particular just upstream of the first measuring chamber 3, by an additional temperature sensor 18, to assess the quick temperature variations of the injected fluid before it is mixed and therefore equalized in temperature with the substantial quantity of fluid already contained in said first chamber 3.

It would not be outside the scope of the invention to:

modify constructive details of the device;

provide any number whatsoever of variable volume measuring chambers, mounted in parallel;

provide that said measuring cambers, instead of all being identical, have different capacities from each other, with at least one larger capacity measuring chamber and at least one smaller capacity measuring chamber;

provide a slightly different operation, in particular with, for one or several of the variable volume measuring chambers, two or several partial filling/emptying cycles for measuring the amount of fuel injected upon each injection step, and with addition of the partial volume measurements thus done, which makes it possible to adapt the device to even higher injection rates, without increasing the size of the device at the variable volume measuring chambers.

The invention claimed is:

1. A device for analyzing a step-by-step injection rate provided by a fuel injection system used in a heat engine, the device comprising:

a first chamber for measuring a constant volume, in which the fuel is injected, a pressure sensor and a temperature sensor being associated with said first measuring chamber for measuring pressure and temperature, respectively, in said first measuring chamber, means for at least partially emptying the first measuring chamber, downstream of the first measuring chamber, a second measuring chamber in which the fuel drained from the first measuring chamber is sent, a volume of the second measuring chamber varying depending on movement of a piston whereof the movement is measured using a movement sensor, an electronic section controlling the device and analyzing information received from the sensors, such that partial draining of the first measuring chamber after injection is done until the pressure in said first measuring chamber is reestablished therein before the injection, wherein at least one additional measuring chamber, a volume of which varies according to the movement of the piston (11a, 11b, ... n) whereof the movement is measured using a movement sensor (13a, 13b, ... n), is mounted downstream of the first measuring chamber, in parallel with the second measuring chamber, such that the fuel drained from the first measuring chamber is received in the second measuring chamber and/or in the or each additional measuring chamber, the electronic section being provided to measure and add the volumes received, for each injection, by the second measuring chamber and by the additional measuring chamber(s), so as to obtain a total volume corresponding to the amount of fuel delivered for an injection step.

2. The device according to claim 1, wherein the electronic section is provided to synchronously control the draining of the first measuring chamber in the second measuring chamber and in the additional measuring chamber(s), and in all of the variable-volume measuring chambers.

3. The device according to claim 1, wherein the electronic section is provided to separately, and sequentially control the draining of the first measuring chamber in the second measuring chamber and in the additional measuring chamber(s), and in the different variable-volume measuring chambers.

4. The device according to claim 1, wherein the second measuring chamber and the additional measuring chamber(s) are all identical and, have the same maximum capacity and the same section that also corresponds to the section of the piston.

5. The device according to claim 1, wherein, among the second measuring chamber and the additional measuring chamber(s), there is at least one measuring chamber with a larger capacity than the others and at least one least one measuring chamber with a smaller capacity than the others, therefore at least two measuring chambers with different capacities and in particular different sections, the electronic section being provided to control one and/or the other of these measuring chambers as a function of the unitary quantities of fuel injected at each step.

6. The device according to claim 1, wherein the pressure sensor, associated with the first constant-volume measuring chamber, includes a dynamic pressure converter and a static pressure converter.

* * * * *